(12) United States Patent
Jantzer

(10) Patent No.: US 7,356,899 B1
(45) Date of Patent: Apr. 15, 2008

(54) TOOL FOR REMOVAL OF UNIVERSAL JOINT

(75) Inventor: Jason C. Jantzer, Phoenix, OR (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 11/622,006

(22) Filed: Jan. 11, 2007

(51) Int. Cl.
*B23P 19/04* (2006.01)
(52) U.S. Cl. ............................. 29/255; 29/244; 29/252
(58) Field of Classification Search ................... 29/244, 29/252, 255
See application file for complete search history.

(56) References Cited

U.S. PATENT DOCUMENTS 3,008,226 A * 11/1961 Kellerman ................... 29/263
5,966,792 A * 10/1999 James ........................ 29/244
7,051,412 B2 5/2006 Hurtado, Jr.

OTHER PUBLICATIONS

A Mechanics dream!; The U-Joint buster; www.geocities.com/ujbuster2002/main.html; Jan. 15, 2007.
SJ Discount Tools; OTC 7057—U-Joint Remover Tool; www.sjdiscounttools.com/otc7057.html; Jan. 15, 2007.

* cited by examiner

*Primary Examiner*—Joseph J. Hail, III
*Assistant Examiner*—Shantese L McDonald
(74) *Attorney, Agent, or Firm*—Banner & Witcoff, Ltd.

(57) ABSTRACT

A tool for removal of a universal joint from a drive shaft includes a drive rod for engagement with a pneumatic driving tool and a cup which may be positioned over the passageway in a drive shaft flange to receive the end of a universal joint arm which is driven from the passageway into the cup to effect removal of the universal joint from the drive shaft.

7 Claims, 3 Drawing Sheets

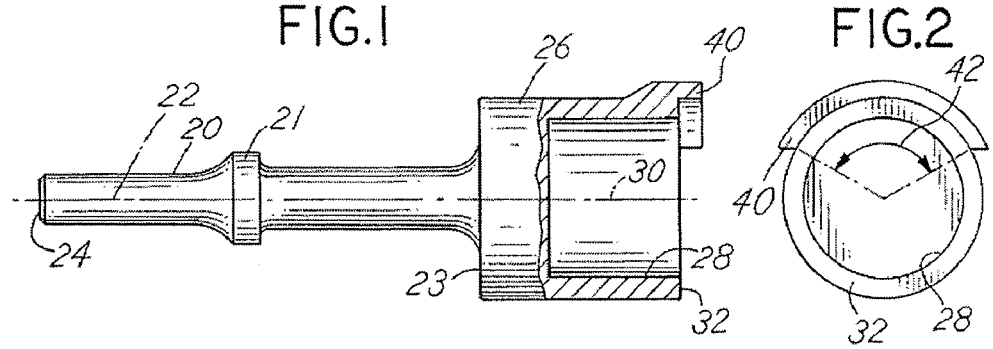
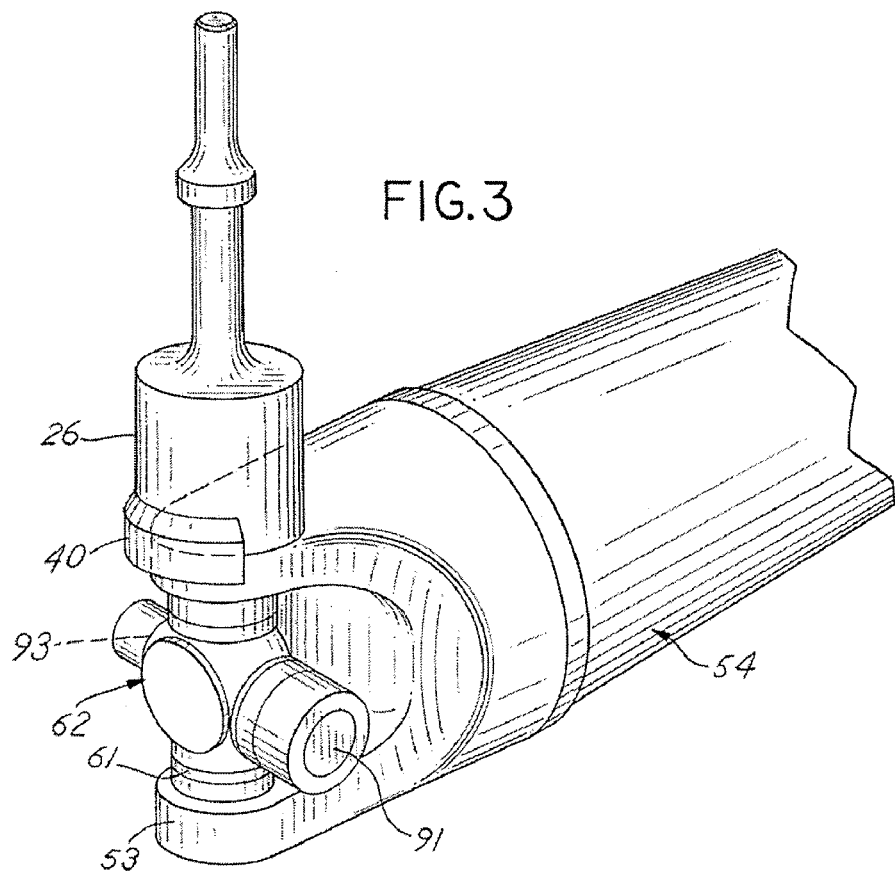

TOOL FOR REMOVAL OF UNIVERSAL JOINT

BACKGROUND OF THE INVENTION

In a principal aspect the present invention relates to a tool utilized to remove a universal joint from engagement with a drive shaft. Typically, such a tool is to be used for the removal of a universal joint associated with the drive shaft of a motor vehicle so that the shaft and the universal joint may be disengaged from one another for purposes of replacement of either the universal joint or the shaft, or both.

Motor vehicles transmit driving force from the vehicle engine to the wheels typically by means of a connecting drive shaft. Most often the drive shaft is comprised of first and second shaft members connected to each other via a universal joint. A typical universal joint includes four equally spaced, radially extending arms with bearings at the outer end of each of the arms and a bearing cap which fits over the bearings. The arms are arrayed at 90° to one another and the bearing caps of two opposed arms are fitted into two opposed openings of a first and second drive shaft member. Often it is necessary to replace either the universal joint or alternatively, the drive shaft. In order to conduct such a replacement, it is necessary to remove the universal joint from engagement with the drive shaft. This operation is often performed by a mechanic who may utilize a pliers and a hammer to effect disengagement or detachment of the universal joint from the drive shaft. The steps to effect such a repair job are detailed at www.mustangandfords.com/howto/5208/. This domain reference is incorporated herewith by reference.

Various prior art tools have also been proposed for facilitating such a repair operation. DD Tools, Product No. 3421 is a typical tool for this purpose. OTC Product Tool No. OTC 7490 is another tool of this nature. Typically, such tools are in the form of a clamp which is used to pull the U-joint or universal joint from disengagement with the drive shaft.

While such tools have met with some commercial success, there has remained the need for an improved method and tool to effect removal of a universal joint from a shaft and, in particular, a tool which may be pneumatically driven.

SUMMARY OF THE INVENTION

Briefly, the present invention comprises a tool for disengaging a universal joint from a drive shaft wherein the drive shaft includes a yoke which includes first and second opposed, spaced generally parallel flanges extending axially from the end of the shaft. Each flange includes a transaxial passageway for receipt of an arm (i.e. bearing cup) of the universal joint. The passageways are axially aligned or oriented so that the end bearing caps of the universal joint arms, which are also aligned, will fit into the passageways defined in the flanges of the yoke of the shaft. The tool comprises a drive rod with a first free or outer end and an opposite or second end with a generally cylindrical cup mounted thereon. The cylinder or cup is sized to fit over the passageway in the flange of a drive shaft. A partially circumferential or partially peripheral rib or extension projects from the end of the cup of the tool to facilitate alignment of the cup of the tool over the passageway in the flange of the drive shaft. The cup of the tool is sized to receive the end cap of a universal joint arm. Thus, the cup is placed over the passageway in the yoke of a drive shaft. The universal joint is then held in a fixed position and a pneumatic tool is impacted against the drive shaft flange to drive the end cap and end of the arm of the universal joint from the passageway in the flange of the yoke into the cup of the tool. After the end cap and arm are driven into the cup, the cup may then be removed and the bearing cap on the end of the arm of the universal joint may be removed. The drive shaft is then rotated 180° and the process is repeated on the opposite bearing cap and arm. The bearing caps are thus each removed and the universal joint is manipulated to thereby be removed from the passageways in the flanges forming the yoke of the drive shaft.

Thus, it is an object of the invention to provide a tool and method for disengaging a universal joint from a drive shaft.

Further, it is an object of the invention to provide a tool for removal and disengaging the universal joint from a drive shaft utilizing a pneumatic driver in combination with the tool.

Another object of the invention is to provide a rugged, lightweight, inexpensive and effective tool and methodology for use of a tool which will effect the removal of a universal joint from a drive shaft.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 1 is a side elevation of an embodiment of a tool of the invention wherein one end of the tool is a partial cross section view;

FIG. 2 is an end view of the tool of FIG. 1 as viewed from the end comprising a cup construction;

FIG. 3 is an isometric view of the tool of FIG. 1 and a typical drive shaft with a universal joint;

DETAILED DESCRIPTION OF AN EMBODIMENT OF THE INVENTION

Figure 4:
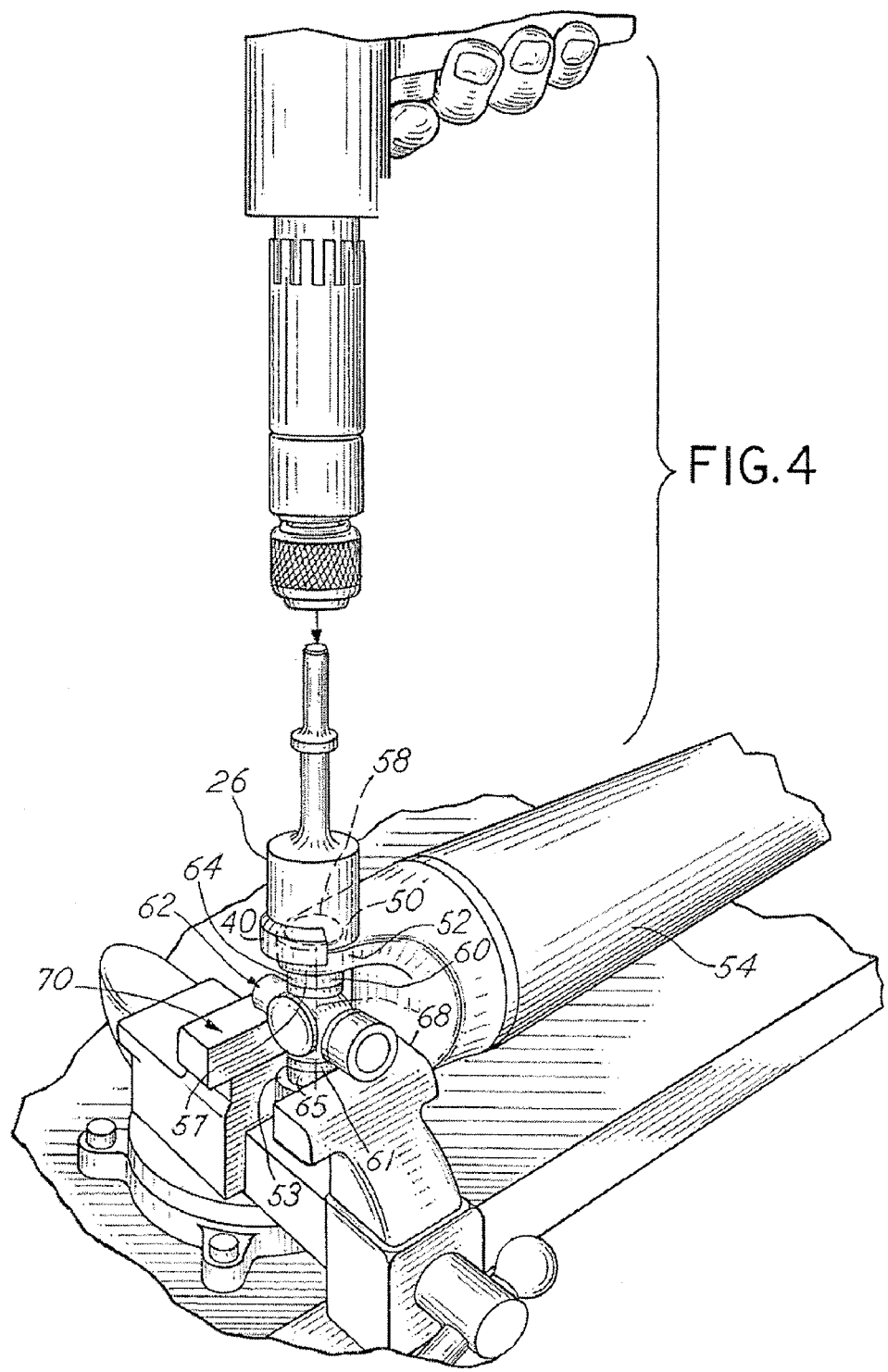
FIG. 4 is an isometric view of the tool of FIG. 1 positioned on a shaft prior to engagement of the tool by a driver such as a pneumatic driver, and wherein the universal joint is supported prior to driving the tool against the shaft.

Referring to the figures, an embodiment of the invention is depicted in FIGS. 1 and 2. The remaining figures depict the tool and the methodology associated with the use of the tool of FIGS. 1 and 2. Referring therefore to FIGS. 1 and 2, the tool is comprised of an elongate drive rod 20 having a longitudinal axis 22. The drive rod 20 further includes a first drive end or outer end 24. The second or opposite end of the rod 20 is formed in the shape of a cylinder or a cup 26. The cup 26 includes a generally cylindrical counterbore or passage 28 with an axis 30 coaxial with the axis 22 of the rod 20. The bore 28 extends axially inwardly from a generally circular outer end land surface 32. The extent of the inward extension of the bore 28 along axis 30 is typically a distance at least adequate to completely receive a bearing cap associated with an arm of a universal joint. In other words, the bearing cap will fit substantially entirely within the volume of the bore 28. The bore 28 shape in cross section is preferably cylindrical though other configurations may be utilized. The diameter of the inside of the bore or counterbore passage 28 is slightly greater than the associated passageway in a drive shaft end flange which holds the end of an arm of a universal joint. This will be apparent from review of the drawings depicting the methodology of use of the tool.

The land 32 typically lies in a plane which is perpendicular to the axis 30 and has a thickness or radial dimension which enables the land 32 to fit against the surface of a yoke flange of a drive shaft. The tool further includes a rib or arcuate projection 40 which extends partially peripherally around the outer edge of the land 32. The flange 40 extends axially from the land 32 and radially outwardly from the land 32. The arc formed by the flange is depicted in FIG. 2; namely, the arc 42 and extends typically between approximately 45° and about 180° around the circumference of cup 26. Most typically, the arc 42 is in the range of about 90°.

The rod 20 is generally a uniform diameter cylindrical rod with a circumferential rib 21 positioned approximately midway between the outer end 24 and a top face 23 of the cylinder or cup 26. The flange or rib 21 is designed to provide a surface against which a pneumatic driver tool may be engaged in order to drive the tool as described with respect to the subsequent FIGS. 3-5.

Figure 5:
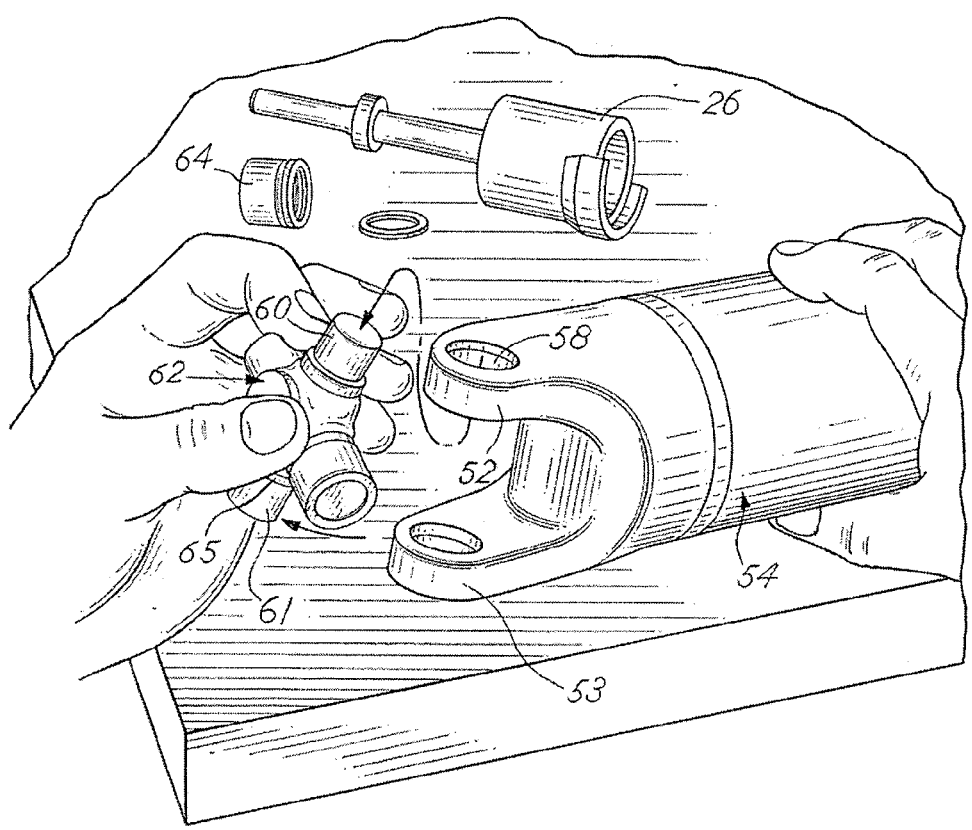
FIG. 5 is an isometric view of the universal joint subsequent to disengagement thereof from the shaft as a result of engaging and driving the shaft by the tool.

Referring to FIGS. 3-5 there is illustrated the methodology associated with the use of the embodiment of the invention. Thus, the tool is positioned against the outside surface 50 of a flange 52 of a first yoke of a drive shaft 54. The bore 28 of cup 26 is thereby positioned over a passageway 58 which receives an arm 60 of a universal joint 62 and more particularly the portion of the universal joint known as the bearing cup 64. Note that the rib, extension or flange 40 fits against a side lateral surface 57 of the flange 52 of the shaft 54. This helps align the axis 30 of the tool with the longitudinal axis 68 of the arm 60 of the universal joint 62. The universal joint 62, of course, is comprised typically of four arms arrayed at 90° from one another. Two arms 91, 93 extending transversely to the arms 60, 61 and are fitted or propped against a support 70. The tool, as aligned as depicted in FIG. 3, is then driven by a pneumatic driver against the flange 52 of shaft 54. This forces the bearing cap 64 and end of the universal joint arm 60 upwardly into the cylindrical cup 26 which is dimensioned to receive the cap 64 and end of the arm 60. Simultaneously, the opposite arm 61 of the universal joint 62 is at least partially disengaged or moved axially from the opposite flange 53 of the yoke of the shaft 54 though the associated bearing cap 65 may not be fully removed. The tool may then be removed to expose the end of the arm 60 universal joint and to remove the cap 64. The counterpart bearing cap 65 associated with the opposite arm 61 may then be removed using the same technique with respect to the second flange 53. The universal joint may be manipulated and removed from the shaft 54.

As a consequence, the tool enables the use of a pneumatic driver to easily drive the shaft or rod 20 in a manner which will effect release of the universal joint 62 from the passageways 58 of the drive shaft 54. It is noted that prior to impacting the tool against the flange 52 of the shaft 54, typically a C-ring or retainer ring is removed from a groove in the flange 52 so that the arm 60 and more particularly the bearing cap 64 on the end of the arm 60 may be moved into the cup or cylinder 26 defined in the tool.

Variations in the construction of the tool may be effected. That is, the size of the bore or opening 28 in the cylindrical cup may be altered, depending upon the size of the universal joint which is to be disengaged from a shaft. The length and shape of the drive rod 20 may be altered. The size, configuration and arrangement of the rib 40 may be altered. Thus, while there has been an embodiment of the invention, it is to be understood that the invention is to be limited the following claims and equivalents thereof.

What is claimed is:

1. A tool for disengaging a universal joint from a drive shaft, said drive shaft including a yoke with first and second, opposed spaced flanges, each flange including a passageway for receipt of an arm of a universal joint, each said passageway including an axis generally transverse to the plane of said passageway, each flange including an outside face and a lateral side edge, said universal joint arms each including a bearing cap for compatible insertion into a said receiving passageway of said shaft, said tool comprising, in combination:

a drive rod including a drive rod axis and an outer end; and a cup mounted on the end of the drive rod opposite the outer end, said cup including a peripheral flange surface, said flange surface sized for engaging a first flange outside face of said shaft by surrounding the passageway of said flange and not extending over or into said passageway of said first flange, said cup including an axis generally coaxially alienable with the axis of said passageway of said first flange and with the axis of said drive rod, said cup including an open end and a counter-bore for receipt of at least a part of an arm of said universal joint from said passageway of said first flange, said cup further including an outside peripheral a partially circumferential, axially extending rib for fitting over a said lateral side of said first flange to align the cup generally coaxially with the axis of said passageway of said first flange whereby said arm in said passageway may be driven into said cup counterbore by engagement of said outer end of said drive rod with a driving mechanism.

2. The tool of claim 1 wherein the drive rod comprises a generally uniform diameter cylindrical rod with a generally radially outwardly extending rib for engagement by a driver tool.

3. The tool of claim 1 wherein the bore is generally cylindrical.

4. The tool of claim 1 wherein the depth of the bore is greater than the axial dimension of the passageway of the flange of said shaft.

5. The tool of claim 3 wherein the diameter of the bore is greater than the diameter of the passageway in the flange of the shaft.

6. The tool of claim 1 wherein the partially circumferential rib is arcuate and forms an arc in the range of about 45° to 180°.

7. A method for disengaging a universal joint from a drive shaft, said drive shaft including an axis, first and second opposed, spaced axially extending flanges, each flange including a transaxial passageway therethrough, said passageways coaxially aligned, said universal joint including first and second oppositely extending arms fitted respectively into the first and second passageways, said method comprising the steps of:

(a) positioning the tool of claim 1 against said first flange outside face; and (b) impacting a force against the first flange outside face of said shaft to drive at least a part of said arm of said universal joint into the cup from the passageway of said first flange.

* * * * *